(12) United States Patent
Tada et al.

(10) Patent No.: US 9,478,805 B2
(45) Date of Patent: *Oct. 25, 2016

(54) CARBONACEOUS MATERIAL FOR NEGATIVE ELECTRODES OF NONAQUEOUS ELECTROLYTE SECONDARY BATTERIES AND METHOD FOR PRODUCING SAME

(71) Applicants: KUREHA CORPORATION, Tokyo (JP); KURARAY CO., LTD., Kurashiki-shi, Okayama (JP); KURARAY CHEMICAL CO., LTD., Bezin-shi, Okayama (JP)

(72) Inventors: Yasuhiro Tada, Tokyo (JP); Yasushi Ebihara, Tokyo (JP); Mayu Komatsu, Tokyo (JP); Jiro Masuko, Tokyo (JP); Hajime Komatsu, Tokyo (JP); Naohiro Sonobe, Tokyo (JP); Junichi Arima, Bizen (JP); Akimi Ogawa, Bizen (JP); Shinya Tago, Bizen (JP); Kenichi Koyakumaru, Bizen (JP); Hideharu Iwasaki, Kurashiki (JP); Kiyoto Otsuka, Bizen (JP)

(73) Assignees: KUREHA CORPORATION, Tokyo (JP); KURARAY CO., LTD., Kurashiki-Shi (JP); KURARAY CHEMICAL CO., LTD., Bizen-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/424,903
(22) PCT Filed: Aug. 30, 2013
(86) PCT No.: PCT/JP2013/073349
§ 371 (c)(1),
(2) Date: Feb. 27, 2015

(87) PCT Pub. No.: WO2014/034858
PCT Pub. Date: Mar. 6, 2014

(65) Prior Publication Data
US 2016/0064735 A1 Mar. 3, 2016

(30) Foreign Application Priority Data
Aug. 30, 2012 (JP) .................... 2012-190705

(51) Int. Cl.
*H01M 4/587* (2010.01)
*C01B 31/02* (2006.01)
*H01M 4/133* (2010.01)
*H01M 4/02* (2006.01)

(52) U.S. Cl.
CPC .............. *H01M 4/587* (2013.01); *C01B 31/02* (2013.01); *H01M 4/133* (2013.01); *H01M 2004/027* (2013.01); *H01M 2220/20* (2013.01); *Y02E 60/122* (2013.01)

(58) Field of Classification Search
CPC ............... H01M 4/583; H01M 10/05; H01M 2220/20; H01M 4/587
See application file for complete search history.

(56) References Cited

U.S. PATENT DOCUMENTS

| | | | |
|---|---|---|---|
| 5,616,436 A | 4/1997 | Sonobe et al. | |
| 5,985,489 A | 11/1999 | Ohsaki et al. | |
| 6,303,249 B1 | 10/2001 | Sonobe et al. | |
| 6,335,122 B1* | 1/2002 | Yamada | H01M 4/133 429/209 |
| 2007/0092429 A1 | 4/2007 | Mao et al. | |
| 2008/0102369 A1 | 5/2008 | Sakata et al. | |
| 2015/0263347 A1* | 9/2015 | Imaji | C01B 31/02 429/231.8 |
| 2015/0270072 A1* | 9/2015 | Sonobe | H01G 11/34 361/502 |

FOREIGN PATENT DOCUMENTS

| | | |
|---|---|---|
| EP | 0409192 A1 | 1/1991 |
| EP | 0700105 A2 | 3/1996 |
| EP | 0817295 A2 | 1/1998 |
| EP | 0 891 943 A1 | 1/1999 |
| JP | 4-338106 A | 11/1992 |
| JP | 8-64207 A | 3/1996 |
| JP | 8-112539 A | 5/1996 |
| JP | 9-161801 A | 6/1997 |
| JP | 10-21919 A | 1/1998 |
| JP | 10-284089 A | 10/1998 |
| JP | 2000-281325 A | 10/2000 |
| JP | 2000-327316 A | 11/2000 |
| WO | WO 97/01192 A1 | 10/1997 |
| WO | WO 98/30496 A1 | 7/1998 |

OTHER PUBLICATIONS

International Search Report issued in PCT/JP2013/073349, mailed on Oct. 8, 2013.
Communication pursuant to Rule 164(1) EPC and partial supplemental search report issued in the corresponding European Patent Application No. 13833740.7 on Feb. 22, 2016.
Extended European Search Report, dated May 24, 2016, for European Application No. 13833740.7.

\* cited by examiner

Primary Examiner — Stewart Fraser
(74) Attorney, Agent, or Firm — Birch, Stewart, Kolasch & Birch, LLP

(57) ABSTRACT

Provided is a manufacturing method of carbonaceous material for a negative electrode of non-aqueous electrolyte secondary batteries, wherein the carbonaceous material is obtained from plant-derived char as a source, potassium is sufficiently removed, and an average particle diameter thereof is small; and a carbonaceous material for a negative electrode of non-aqueous electrolyte secondary batteries.

The method for manufacturing a carbonaceous material having an average particle diameter of 3 to 30 μm, for a negative electrode of non-aqueous electrolyte secondary batteries includes the steps of: (1) heating plant-derived char having an average particle diameter of 100 to 10000 μm at 500° C. to 1250° C. under an inert gas atmosphere containing halogen compound to demineralize in a gas-phase, (2) pulverizing a carbon precursor obtained by demineralization in a gas-phase, (3) calcining the pulverized carbon precursor at 1000° C. to 1600° C. under an non-oxidizing gas atmosphere.

10 Claims, 1 Drawing Sheet

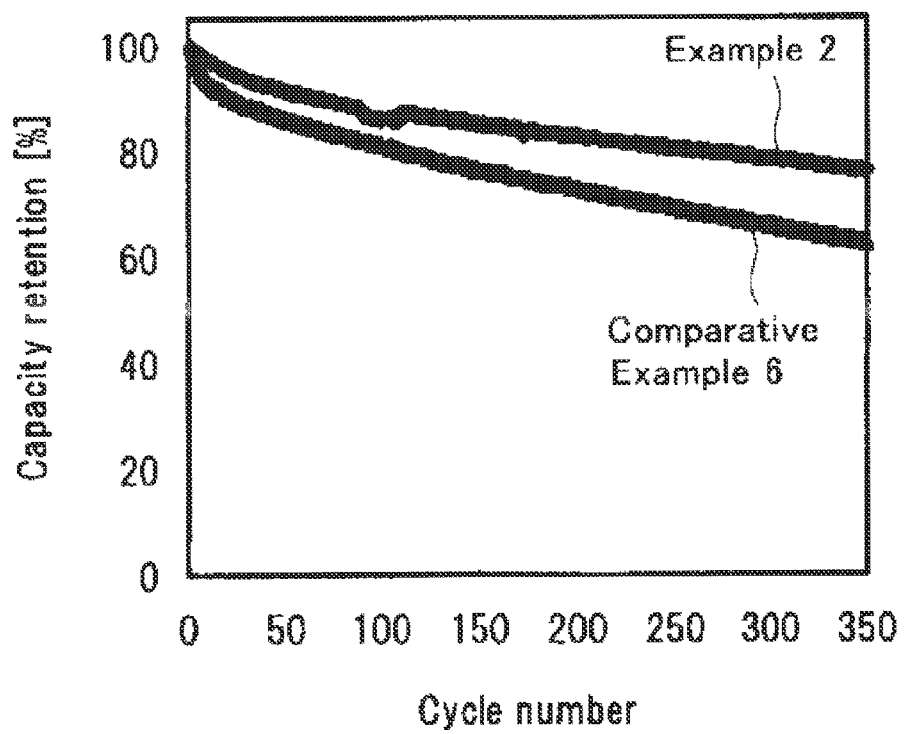

CARBONACEOUS MATERIAL FOR NEGATIVE ELECTRODES OF NONAQUEOUS ELECTROLYTE SECONDARY BATTERIES AND METHOD FOR PRODUCING SAME

TECHNICAL FIELD

The present invention relates to a carbonaceous material for a negative electrode of non-aqueous electrolyte secondary batteries, and a process for manufacturing the same. According to the present invention, a plant-derived carbonaceous material for a negative electrode having an average particle diameter of 30 μm or less can be industrially manufactured in large quantity.

BACKGROUND ART

Recently, due to a growing concern about environmental problems, an installation of a large lithium-ion secondary battery having high energy density and excellent output performance in an electrical vehicle has been examined. A capacity per volume is important to small-size portable instruments such as cellular phones and laptop computers, and thus a graphitic material having high density is mainly used as a negative electrode active material. However, a lithium-ion secondary battery for a vehicle is large and expensive, and thus, cannot be easily exchanged in the middle of the life of the vehicle. Therefore, it is required to exhibit durability comparable to the durability of the vehicle. That is, it is expected to achieve life duration of 10 or more years (high durability). The graphitic material or a carbonaceous material having developed graphite structures is easily destroyed by expansion and constriction of crystallites due to a repetition of doping and dedoping the lithium, and thus a repetition performance of charge-discharge is poor. Therefore, they are unsuitable for negative electrode material for a lithium-ion secondary battery for a vehicle that is required to exhibit high cycle durability. On the other hand, non-graphitizable carbon material causes little expansion and constriction at the time of doping and dedoping of lithium to exhibit a high cycle durability so that it is suitable for use in cars (Patent literature 1).

Further, a charge-discharge curve of non-graphitizable carbon material is gentle compared to that of graphitic material, and the potential difference to the regulation limit of the charge is wide. Thus, a battery using non-graphitizable carbon material as a negative electrode active material can be rapidly charged compared to that using graphitic material. Furthermore, as the non-graphitizable carbon material has low crystallinity compared to graphitic material and a number of sites capable of contributing to charge and discharge, it has an excellent rapid charge-discharge performance. In connection with this, a charging time was 1 to 2 hours in small-size, portable instruments. However, a charging time of batteries for hybrid vehicles is several tens of seconds in view of energy regeneration at the time of braking, and a discharge time thereof is also several tens of seconds in view of the pressing time of the gas pedal. Therefore, particularly-excellent, rapid charge-discharge performance (input/output performance) is required in the batteries for hybrid vehicles. The negative electrode material disclosed in Patent literature 1 has high durability. However, the performance thereof is insufficient as the negative electrode material for a lithium-ion secondary battery for a vehicle in which the particularly-excellent, rapid charge-discharge performance is required, and thus, further performance improvement is expected.

Hitherto, the petroleum pitch and coal pitch are used as a carbon source of non-graphitizable carbon. The inventors of the present invention found that a carbonaceous material for a negative electrode obtained by using plant-derived char (plant-derived organic substance) as a carbon source can be doped with a large amount of active material, and thus it has promise as a negative electrode material (Patent literatures 2 and 3). However, when the plant-derived char (plant-derived organic substance) is used as a carbon source of carbonaceous material for a negative electrode, potassium found in organic, raw material had an unsuitable effect on the doping and dedoping performance. In order to solve the above problem, Patent literature 3 discloses a method for reducing an amount of potassium wherein the plant-derived char (plant-derived organic substance) is washed by acid so as to demineralize (hereinafter referred to as a demineralization in liquid-phase) (Patent literature 3). That is to say, in the method for preparing a carbonaceous material for a negative electrode wherein the plant-derived char (plant-derived organic substance) is used as a carbon source, the demineralizing treatment is required.

CITATION LIST

Patent Literature

[Patent literature 1] Japanese Unexamined Patent Publication (Kokai) No. 8-64207
[Patent literature 2] Japanese Unexamined Patent Publication (Kokai) No. 9-161801
[Patent literature 3] Japanese Unexamined Patent Publication (Kokai) No. 10-21919
[Patent literature 4] Japanese Unexamined Patent Publication (Kokai) No. 2000-281325

SUMMARY OF INVENTION

Technical Problem

Patent literature 3 discloses that a demineralization rate is remarkably reduced in the case that materials to be treated have large particle diameters at the time of demineralization in liquid-phase, and thus the particle diameter of the carbonaceous material is preferably 100 μm or less. In fact, a carbonaceous material precursor having a particle diameter of 25 μm is used in the Example of Patent literature 3. The present inventors prepared carbonaceous material for a negative electrode of non-aqueous electrolyte secondary batteries having an average particle diameter of 19 μm, using demineralization in liquid-phase described in Patent literature 2 (Comparative Example 5). In the demineralization in liquid-phase, it is necessary to remove a mineral-eluted solution by filtration. However, if the average particle diameter becomes smaller, it takes washing water a long time to pass through a tank wherein carbon materials are filled at the time of filtration. Thus, it is very difficult to efficiently remove the solution in a short time. Even if the solution can be removed, the obtained products are expensive. Thus, for practical purpose, it is difficult to industrially-produce the carbonaceous material with an average particle diameter of less than 20 μm for a negative electrode of non-aqueous electrolyte secondary batteries by using demineralization in liquid-phase.

Therefore, the object of the present invention is to provide a method for manufacturing a carbonaceous material having a small, average particle diameter, for a negative electrode of non-aqueous electrolyte secondary batteries, wherein the carbonaceous material is produced by using plant-derived char as a starting material, and potassium is sufficiently demineralized; and a carbonaceous material for a negative electrode of non-aqueous electrolyte secondary batteries.

Solution to Problem

The present inventors have conducted intensive studies into a demineralization method which can be used industrially in the method for manufacturing a plant-derived carbonaceous material for a negative electrode, and as a result, surprisingly found that potassium can be removed by heating the plant-derived char in an inert gas atmosphere containing a halogen compound at 500° C. to 1250° C. (hereinafter, sometimes referred to as a demineralization in gas-phase), and the plant-derived carbonaceous material for a negative electrode can be industrially manufactured in large quantity by using the method of demineralization in a gas-phase.

Further, the present inventors examined the performance of non-aqueous electrolyte secondary batteries wherein the carbonaceous material obtained by demineralization in a liquid-phase or demineralization in a gas-phase is used as the negative electrode, and then, found that there was a tendency that a carbonaceous material obtained by the demineralization in a gas-phase has an excellent doping and dedoping performance.

Furthermore, the present inventors examined the carbonaceous material obtained by demineralization in a liquid-phase or demineralization in a gas-phase, and then, found that iron in the carbonaceous material obtained by demineralization in the gas-phase was remarkably removed more than 10 times than in the carbonaceous material obtained by demineralization in the liquid-phase. If iron is present in carbon as iron oxide, it is considered that a reaction caused by the insertion of lithium into iron oxide occurs, and it has an unsuitable effect on the doping and dedoping performance. Further, there is a possibility that iron oxide is reduced to metallic iron, and then impurities are produced. In addition, when iron is present in carbon as metallic iron or iron is eluted to an electrolytic solution to re-deposit, there is a possibility that the temperature of the battery rises by occurrences of micro short circuits. The carbonaceous material obtained by demineralization in the gas-phase is excellent in the removal of iron. Therefore, it has an excellent doping and dedoping performance compared to the carbonaceous material obtained by demineralization in the liquid-phase, and safety-assured non-aqueous electrolyte secondary batteries can be manufactured thereby.

Further, the non-aqueous electrolyte secondary batteries using the carbonaceous material for a negative electrode of non-aqueous electrolyte secondary batteries of the present invention exhibits excellent output performances and cycle performances, compared to a carbonaceous material derived from petroleum pitch. Even further, the present inventors found that the non-aqueous electrolyte secondary batteries having a low, irreversible capacity can be obtained by removing particles with a particle diameter of 1 µm or less from carbonaceous material for a negative electrode.

The present invention is based on the above findings.

Therefore, the present invention relates to

[1] a method for manufacturing a carbonaceous material having an average particle diameter of 3 to 30 µm, for a negative electrode of non-aqueous electrolyte secondary batteries comprising the steps of: (1) heating plant-derived char having an average particle diameter of 100 to 10000 µm at 500° C. to 1250° C. under an inert gas atmosphere containing halogen compound to demineralize in a gas-phase, (2) pulverizing a carbon precursor obtained by the demineralization in gas-phase, and (3) heat treating the pulverized carbon precursor at 1000° C. to 1600° C. under a non-oxidizing gas atmosphere,

[2] the method for manufacturing a carbonaceous material for a negative electrode of non-aqueous electrolyte secondary batteries of the item [1], further compris a step of removing particles having a particle diameter of 1 µm or less so that the volume thereof became 3 volume % or less, during or after the pulverizing step (2),

[3] a carbonaceous material having an average particle diameter of 3 to 30 µm, for a negative electrode of non-aqueous electrolyte secondary batteries, obtained by a method comprising the steps of: (1) heating plant-derived char having an average particle diameter of 100 to 10000 µm at 500° C. to 1250° C. under an inert gas atmosphere containing a halogen compound to demineralize in a gas-phase, (2) pulverizing a carbon precursor obtained by the demineralization in a gas-phase, and (3) heat treating the pulverized carbon precursor at 1000° C. to 1600° C. under a non-oxidizing gas atmosphere,

[4] the carbonaceous material for a negative electrode of non-aqueous electrolyte secondary batteries of the item [3], wherein the method further comprises a step of removing particles having a particle diameter of 1 µm or less so that a volume thereof became 3 volume % or less, during or after the pulverizing step (2),

[5] a carbonaceous material for a negative electrode of non-aqueous electrolyte secondary batteries of the item [3] or [4], wherein a specific surface area is 1 to 50 $m^2/g$, an amount of potassium contained therein is 0.1 weight % or less, and an amount of iron contained therein is 0.02 weight % or less,

[6] a negative electrode of a non-aqueous electrolyte secondary battery comprising the carbonaceous material of any one of the items [3] to [5],

[7] the negative electrode of a non-aqueous electrolyte secondary battery of the item [6], wherein an active material layer exists on one surface or both surfaces of metal current collector substrate, and a thickness of the active material layer on one surface is 80 µm or less,

[8] a non-aqueous electrolyte secondary battery comprising the carbonaceous material of any one of the items [3] to [5],

[9] a non-aqueous electrolyte secondary battery comprising the negative electrode of the item [6] or [7], or

[10] a vehicle having the non-aqueous electrolyte secondary battery of the item [8] or [9].

Patent literature 4 discloses an activated carbon having a high adsorbability of trihalomethane and humic acid, and further discloses that a carbonaceous material having residue on ignition of 3 weight % or more is heated in a current of inert gas containing a halogen compound. It is speculated that a pore structure suitable for adsorption of trihalomethane and humic acid is formed on a surface of carbon through the above heat treatment.

In the heat treatment disclosed in Patent literature 4, the halogen compound is used in the same manner as the demineralization in the gas-phase of the present invention. However, in the heat treatment of the Example in Patent literature 4, a mixture ratio of the halogen compound is high i.e. 20%. Further, Patent literature 4 discloses that if the heat treatment at 500° C. or less, or 1300° C. or more is carried out, the adsorbability of trihalomethane becomes lower by a subsequent activation treatment. Therefore, the object of the heat treatment in Patent literature 4 is to prepare the activated carbon which has a specific surface area of 1000 $m^2/g$ or more and the high adsorbability of trihalomethane and humic acid, by the formation of pores on the surface of carbon and the activation treatment. That is, the above object is different from that of the demineralization in the gas-phase in the present invention. Further, the activated carbon having a high specific surface area for adsorbing toxic substances is prepared in Patent literature 4. Therefore, the technical field of the carbonaceous material having low specific surface area for non-aqueous electrolyte secondary batteries of the present invention is different from that of the invention disclosed in Patent literature 4.

Further, the treatment by demineralization in the gas-phase in the present invention can improve electrical characteristics as a negative electrode of carbonaceous material for a negative electrode. On the other hand, Patent literature 4 discloses that the adsorbability of trihalomethane and humic acid is improved by the above heat treatment, but does not disclose or suggest that the electrical characteristics as a negative electrode of carbonaceous material is improved thereby. Therefore, it is surprising that the carbonaceous material for the negative electrode having excellent electrical characteristics as a negative electrode can be obtained by the heat treatment with a halogen compound.

Advantageous Effects of Invention

According to the method for manufacturing the carbonaceous material for a negative electrode of non-aqueous electrolyte secondary batteries of the present invention, a plant-derived carbonaceous material for a negative electrode, which has excellent electrical characteristics as a negative electrode, can be industrially obtained in large quantity. Specifically, according to the method for manufacturing of the present invention, the plant-derived carbonaceous material for a negative electrode wherein potassium and iron are efficiently removed and the average particle diameter thereof is small, can be industrially obtained in large quantity, and thus, a thin negative electrode can be prepared. That is to say, the resistance of a negative electrode can be reduced, and thus a non-aqueous electrolyte secondary battery having a low irreversible capacity and an excellent output performance, and capable of rapidly charging, can be prepared. Furthermore, the non-aqueous electrolyte secondary battery using the carbonaceous material for a negative electrode of non-aqueous electrolyte secondary batteries of the present invention, exhibits excellent output performances and cycle performances, compared to a carbonaceous material derived from petroleum pitch.

Even further, the non-aqueous electrolyte secondary batteries having a low, irreversible capacity can be obtained by removing particles with a particle diameter of 1 μm or less from carbonaceous material for a negative electrode.

BRIEF DESCRIPTION OF THE DRAWINGS

FIG. 1 is a graph showing the change of cycle performances of non-aqueous electrolyte secondary batteries using the carbonaceous material obtained in Example 2 and Comparative example 6 at high temperature.

DESCRIPTION OF EMBODIMENTS

[1] Method for Manufacturing Carbonaceous Material for Negative Electrode of Non-Aqueous Electrolyte Secondary Batteries The method for manufacturing a carbonaceous material having an average particle diameter of 3 to 30 μm, for a negative electrode of non-aqueous electrolyte secondary batteries of the present invention comprises the steps of: (1) heating plant-derived char having an average particle diameter of 100 to 10000 μm at 500° C. to 1250° C. under an inert gas atmosphere containing a halogen compound to demineralize in a gas-phase, (2) pulverizing a carbon precursor obtained by the demineralization in a gas-phase, and (3) heat treating the pulverized carbon precursor at 1000° C. to 1600° C. under a non-oxidizing gas atmosphere. Further, the method for manufacturing of the present invention may be comprise a step of removing particles having a particle diameter of 1 μm or less so that a volume thereof became 3 volume % or less, with or after the pulverizing step (2).

(Plant-Derived Char)

A raw plant of the plant-derived char (carbon precursor) which may be used in the present invention, is not particularly limited, for example, there may be mentioned palm shell, coffee bean, tea leaf, sugar cane, fruit (mandarin orange, or banana), straw, broad-leaf tree, broad-leaf tree, and chaff. The above raw plants can be used alone or in combination of two or more. However, palm shell is preferable because palm shells can be available in large amounts. A palm which is a raw of the palm shell is not particularly limited, but includes oil palm (palm tree), coconut, salak, or double coconut. Palm shells obtained from these palms can be used alone or in combination of two or more, but palm shell derived from coconut or oil palm is most preferable. This is because coconut or oil palm is used as a raw of foods, detergents, or biodiesel fuels, as a result the palm shell thereof is generated as a biomass waste in large amounts. In the method for manufacturing of the present invention, a form of char (such as palm shell char) which is obtained by preliminarily heat treating the above plants is available, and thus the char is preferably used as a source thereof. Generally, the char means a carbon-riched, powdery solid substance which is generated by heating coal without melting and softening. However, in the present specification, the char also means a carbon-riched, powdery solid substance which is generated by heating organic substance without melting and softening.

A method for preparing chars from plants is not particularly limited. However, for example, the char may be prepared by heating a plant material under an inert gas atmosphere at 300° C. or more.

The carbonaceous materials for a negative electrode prepared from these plant-derived chars can be doped with a large amount of active material, and thus it is useful as the negative electrode material for non-aqueous electrolyte secondary batteries. However, the plant-derived char contains a wide variety of metallic elements. In particular, it contains a large amount of potassium. (For example, the palm shell char contains about 0.3% of potassium.) Further, if the carbonaceous material prepared from a plant-derived char containing a large amount of a metallic element such as iron (For example, palm shell char contains 0.1% of iron.) is used as the negative electrode, it will have an unsuitable effect on electrochemical performance and safety. Therefore, it is preferable that the amounts of potassium, iron and the like contained in the carbonaceous material for a negative electrode are reduced as much as possible.

Further, the plant-derived char contains alkali metal such as sodium, alkali earth metal such as magnesium or calcium, transition metal such as iron or copper, and other elements in addition to potassium, and thus it is preferable that the amounts of these elements contained therein are also reduced. If these metals are contained therein, there is a high possibility that impurities are eluted to the electrolytic solution in dedoping from the negative electrode, and it has adverse effects on battery performance and safety.

<<Demineralization Step in Gas-Phase (1)>>

In the demineralization step in the gas-phase (1) in the method for the manufacturing of the present invention, the plant-derived char is heated at 500° C. to 1250° C. in an inert gas atmosphere containing a halogen compound. Potassium and iron can be effectively removed by demineralization in the gas-phase. Specifically, iron can be effectively removed compared to demineralization in the liquid-phase. Further, alkali metal and alkali earth metal other than potassium can be removed, and further transition metal such as copper or nickel can also be removed.

The halogen compound used in demineralization in the gas-phase is not particularly limited, for example, there may be mentioned a fluorine, chlorine, bromine, hydrogen fluoride, hydrogen chloride, hydrogen bromide, iodine bromide, chlorine fluoride (CIF), iodine chloride (ICl), iodine bromide (IBr), bromine chloride (BrCl), or the like, compound capable of generating the above halogen compound by pyrolysis, or a mixture thereof, but hydrogen chloride is preferable.

Further, the halogen compound may be mixed with an inert gas and used. The mixed inert gas is not particularly limited, so long as it does not react with carbonaceous material at the treatment temperature. For example, there may be mentioned nitrogen gas, helium gas, argon gas, or krypton gas, or a mixed gas thereof, but nitrogen gas is preferable. Furthermore, it is preferable that a concentration of impure gas, in particular oxygen gas contained in the inert gas, is decreased at the lowest possible level. For example, an acceptable oxygen concentration is 0 to 2000 ppm, more preferably 0 to 1000 ppm.

In demineralization in the gas-phase, a mixture ratio between the inert gas and the halogen compound is not limited, so long as the plant-derived char is sufficiently demineralized. However, an amount of halogen compound with respect to the inert gas is preferably 0.1 to 10.0 volume %, more preferably 0.3 to 5.0 volume %, further preferably 0.5 to 3.0 volume %.

A temperature of demineralization in the gas-phase is 500° C. to 1250° C., preferably 600° C. to 1250° C., more preferably 700° C. to 1200° C., further preferably 800° C. to 1150° C. If the temperature is lower than 500° C., the demineralization efficiency becomes lower and the demineralization may be insufficient. If the temperature is higher than 1250° C., the plant-derived char may be activated by the halogen compound.

Further, a time of demineralization in the gas-phase is not particularly limited, but preferably 5 to 300 minutes, more preferably 10 to 200 minutes, further preferably 30 to 150 minutes.

The demineralization step in the gas-phase (1) is carried out to remove potassium, iron, and the like contained in the plant-derived char. The amount of potassium after the demineralization step in the gas-phase (1) is preferably 0.1 weight % or less, more preferably 0.05 weight % or less, further preferably 0.03 weight % or less. Further, the amounts of iron is preferably 0.02 weight % or less, more preferably 0.015 weight % or less, more preferably 0.010 weight % or less, further preferably 0.005 weight % or less. If the amount of potassium is higher than 0.1 weight % and the amount of iron is higher than 0.02 weight %, dedoping capacity becomes lower and non-dedoping capacity becomes higher in the non-aqueous electrolyte secondary battery using the obtained carbonaceous material for a negative electrode. In addition to that, when metal elements are eluted to an electrolytic solution and re-deposit, a short circuit occurs and thus it sometimes become a serious safety problem.

The mechanism of effectively removing potassium, other alkali metal, alkali earth metal, and transition metal have not been fully elucidated, but are presumed to be as follows. Metals such as potassium contained in the plant-derived char are reacted with a halogen compound diffused in the char to become a metallic halide such as chloride or bromide. Then, it is considered that potassium, iron, and the like can be removed by volatilizing (detaching) the generated metallic halide by heat. In the case of the mechanism of the generation of metallic halide by the diffusion of a halogen compound into char and the reaction of metal with the halogen compound, it is considered that potassium and iron are effectively removed due to a high diffusion of a halogen compound in the gas-phase, compared to the demineralization in liquid-phase due to a high diffusion of a halogen compound in the gas-phase. However, the present invention is by no means limited to the above explanation.

A particle diameter of the plant-derived char used in demineralization in the gas-phase is not particularly limited. However, if the particle diameter is too small, it becomes difficult to separate the plant-derived char from a gas phase containing the removed potassium. Therefore, the lower limit of the particle diameter is preferably 100 μm or more, more preferably 200 μm or more, further preferably 300 μm or more. The upper limit of the particle diameter is preferably 10000 μm or less, more preferably 8000 μm or less, further preferably 5000 μm or less.

Further, an apparatus used in demineralization in the gas-phase is not limited, so long as it can heat a mixed gas of inert gas and a halogen compound while mixing them. However, for example, demineralization in the gas-phase can be performed by a continuous-type or batch-type in-layer circulating method using a fluidized bed furnace. A supplied amount (circulated amount) of the mixed gas is also not limited, but, for example, is 1 mL/minute or more, preferably 5 mL/minute or more, further preferably 10 mL/minute or more per 1 gram of the plant-derived char.

In demineralization in the gas-phase, it is preferable that heat treatment in the absence of a halogen compound is carried out after the heat treatment in the inert gas atmosphere containing a halogen compound. That is, a halogen is contained in the carbon precursor by contact with a halogen compound, and thus it is preferable that a halogen contained in the carbon precursor is removed by heat treatment in the absence of a halogen compound. In particular, the heat treatment in the absence of a halogen compound is carried out by heating the carbon precursor in an inert gas atmosphere without a halogen compound at 500° C. to 1250° C. Preferably, a temperature of the heat treatment in the absence of a halogen compound is the same temperature as the first heat treatment in the inert gas atmosphere containing a halogen compound, or is higher than the temperature thereof. For example, a halogen can be removed therefrom by carrying out heat treatment while cutting off the halogen compound supply, after the heat treatment with the halogen compound. A time of heat treatment in the absence of the halogen compound is not particularly limited, but preferably 5 to 300 minutes, more preferably 10 to 200 minutes, further preferably 10 to 150 minutes, most preferably 10 to 100 minutes.

<<Pulverizing Step (2)>>

In the pulverizing step(2) in the present invention, the carbon precursor in which potassium and iron are removed, is pulverized so as to provide an average particle diameter of 3 to 30 µm. That is to say, an average particle diameter of the resulting carbonaceous material is adjusted to 3 to 30 µm through the pulverizing step (2). Further, the pulverizing step (2) preferably comprises a classification. The average particle diameter thereof can be accurately adjusted and further particles having a particle diameter of 1 µm or less can be removed. The plant-derived char (carbon precursor) demineralized in the gas-phase does not melt through heat treatment. Thus, an order of the pulverizing step (2) is not particularly limited so long as it is carried out after the demineralization step in the gas-phase (1), in view of an efficiency of the demineralization step in the gas-phase. However, it is preferably carried out before the heat treatment step (3), mentioned below. The reasons for this are as follows. If the pulverizing step (2) is carried out before the demineralization step in the gas-phase (1), a recovery rate (yield) in the demineralization in the gas-phase is decreased because the diameter of particles is fine. In addition, equipment for collecting the particles grows in stature and thus a volume efficiency of equipment becomes low. However, it is not excluded that the pulverization is carried out after the heat treatment step.

A grinder used for pulverization is not particularly limited, for example, but a jet mill, a ball mill, a hammer mill, or a rod mill can be used alone or in combination of two or more. However, the jet mill with classification means is preferable, from the viewpoint of a decrease in the development of fine particles. On the other hand, when the ball mill, hammer mill, or rod mill is used, the fine particles can be removed by classification after pulverization.

(Classification)

As for the classification, there may be mentioned a classification by sieve, wet type classification, or dry type classification. A wet type classifier includes, for example, one based on the principle of gravitational classification, inertial classification, hydraulic classification, centrifugal classification or the like. Further, a dry type classifier includes, for example, ones based on principle of sedimentation classification, mechanical classification, centrifugal classification, or the like.

In the pulverizing step, the pulverization and the classification can be carried out using one apparatus. For example, the pulverization and the classification can be carried out by using a jet mill with dry type classification means. Further, an independent classifier and a pulverizer can also be used. In this case, the pulverization and the classification may be continuously or discontinuously carried out.

(Removal of Particles Having a Particle Diameter of 1 µm or Less)

In the manufacturing method of the present invention, it is preferable that particles having a particle diameter of 1 µm are removed so that amounts thereof become 3 volume % or less, as mentioned above. An order of the removal of particles having a particle diameter of 1 µm or less is not limited, so long as it is carried out after the pulverization, but it is preferable that the removal is carried out at the same time as the classification in the pulverizing step(2).

The particles having a particle diameter of 1 µm or less contained in the carbonaceous material prepared by the manufacturing method of the present invention is 3 volume % or less, more preferably 2.5 volume % or less, further preferably 2.0 volume % or less. The specific surface area thereof is decreased by removing the particles having a particle diameter of 1 µm or less, to thereby obtain non-aqueous electrolyte secondary batteries having a low irreversible capacity.

(Average Particle Diameter)

An average particle diameter ($Dv_{50}$) of carbonaceous material for non-aqueous electrolyte secondary batteries obtained through the method of the present invention is 3 to 30 µm. If the average particle diameter is less than 3 µm, fine particles are increased and then the specific surface area of the carbonaceous material is increased. As a result, a reactivity of the carbonaceous material with an electrolytic solution is increased, and then an irreversible capacity which can be used in charging but cannot be used in discharging, is increased. That is, a rate of unusable capacity of a positive electrode is increased, and thus, the average particle diameter of less than 3 µm is not preferable. Further, if a negative electrode is manufactured using the resulting carbonaceous material, each cavity between carbonaceous materials becomes small, and thus a mobility of lithium ions in the electrolyte solution is suppressed. Therefore, it is not preferable. The lower limit of the average particle diameter is preferably 3 µm or more, more preferably 3.5 µm or more, further preferably 4 µm or more, most preferably 5 µm or more. On the other hand, the average particle diameter of 30 µm or less is preferable. This is because a diffusion-free path of lithium ions in the particle is short, and thus it is possible to rapidly charge and discharge. Further, in order to improve the input/output performances, it is important to enlarge an electrode area in the non-aqueous electrolyte secondary batteries. Thus, it is required to reduce the coating thickness of an active material to a current collector in an electrode preparation. In order to reduce the coating thickness, it is required to reduce the particle diameter of the active material. From this perspective, the upper limit of the average particle diameter is preferably 30 µm or less, more preferably 19 µm or less, further preferably 17 µm or less, further preferably 17 µm or less, further preferably 16 µm or less, most preferably 15 µm or less.

The pulverized carbon precursor is heat treated in the heat treatment step (3). At this time, the pulverized carbon precursor shrinks at a rate of about 0 to 20% according to the heat treatment condition. Thus, it is preferable that the average particle diameter of the pulverized carbon precursor is increased in the range of about 0 to 20%, in order to finally obtain the carbonaceous material for a negative electrode of non-aqueous electrolyte secondary batteries having an average particle diameter ($Dv_{50}$) of 3 to 30 µm. The average particle diameter after pulverization is not limited so long as the average particle diameter of the resulting carbonaceous material becomes 3 to 30 µm. However, the average particle diameter ($Dv_{50}$) is preferably adjusted to 3 to 36 µm. The average particle diameter is more preferably 3 to 22.8 µm, further preferably 3 to 20.4 µm, further preferably 3 to 19.2 µm, most preferably 3 to 18 µm.

<<Heat Treatment Step (3)>>

In the heat treatment step (3) in the manufacturing method of the present invention, the pulverized carbon precursor is heated at 1000° C. to 1600° C. under a non-oxidizing gas atmosphere. The heat treatment at 1000° C. to 1600° C. is generally referred to as "final heat treatment" in the technical field of the present invention. Further, in the heat treatment step of the present invention, a pre-heat treatment can be optionally carried out before the final heat treatment.

(Final Heat Treatment)

The final heat treatment step in the manufacturing method of the present invention can be carried out according to a conventional procedure of the final heat treatment. The carbonaceous material for a negative electrode of non-aqueous electrolyte secondary batteries can be obtained by performing the final heat treatment. The temperature of the final heat treatment is 1000 to 1600° C. If the temperature of the final heat treatment is less than 1000° C., a large amount of functional groups remain in the carbonaceous material, and thus the value of H/C increases. As a result, the irreversible capacity is increased due to a reaction with lithium, which is not preferable. The lower limit of the final heat treatment temperature in the present invention is at least 900° C., more preferably at least 1100° C., and most preferably at least 1150° C. On the other hand, when the final heat treatment temperature exceeds 1600° C., the selective orientation of the carbon hexagonal plane increases, and the discharge capacity decreases, which is not preferable. The upper limit of the final heat treatment temperature in the present invention is at most 1600° C., more preferably at most 1500° C., and most preferably at most 1450° C.

Final heat treatment is preferably performed in a non-oxidizing gas atmosphere. Examples of non-oxidizing gases include helium, nitrogen, argon, or the like, and these may be used alone or as a mixture. Further, the final heat treatment may be performed in a gas atmosphere in which a halogen gas such as chlorine is mixed with the non-oxidizing gas described above. The supplied amount (circulated amount) of the gas is also not limited, but is 1 mL/minute or more, preferably 5 mL/minute or more, further preferably 10 mL/minute or more per 1 gram of the demineralized carbon precursor. In addition, final heat treatent can be performed under reduced pressure at a pressure of 10 kPa or less, for example. The final heat treatment time is not particularly limited. However, for example, the final heat treatment can be performed for 0.05 to 10 hours as a retention time of 1000° C. or more, preferably for 0.05 to 3 hours, and more preferably for 0.05 to 1 hour.

In the present specification, the "carbon precursor" means the plant-derived char before implementation of the final heat treatment.

(Pre-Heat Treatment)

In the manufacturing method of the present invention, the pre-heat treatment can be carried out. The pre-heat treatment is performed by heat treating a carbon source at a temperature of at least 300° C. and less than 900° C. For example, a volatile matter such as $CO_2$, $COCH_4$, and $H_2$, and tar content, are removed by the pre-heat treatment. Thus the generation of these components can be reduced and the load of the furnace can be reduced in the final heat treatment. When the pre-heat treatment temperature is less than 300° C., de-tarring becomes insufficient, and the amount of tar or gas generated in the final heat treatment after pulverization becomes large. This may adhere to the particle surface and cause a decrease in battery performance without being able to maintain the surface properties after pulverization, which is not preferable. On the other hand, when the pre-heat treatment temperature is 900° C. or higher, the temperature exceeds the tar-generating temperature range, and the used energy efficiency decreases, which is not preferable. Furthermore, the generated tar causes a secondary decomposition reaction, and the tar adheres to the carbon precursor and causes a decrease in performance, which is not preferable.

Pre-heat treatment is performed in an inert gas atmosphere, and examples of inert gases include nitrogen, argon, or the like. In addition, pre-heat treatment can be performed under reduced pressure at a pressure of 10 kPa or less, for example. The time of pre-heat treatment is not particularly limited, but, for example, pre-heat treatment may be performed for 0.5 to 10 hours, and is preferably performed for 1 to 5 hours. In the present specification, the pre-heat treatment means a heat treatment in the inert gas atmosphere at a temperature of at least 300° C. and less than 900° C. Therefore, the treatment of demineralization in the gas-phase may be referred to as pre-heat treatment.

Further, the pulverizing step (2) may be carried out after the pre-heat treatment.

[2] Carbonaceous Material for a Negative Electrode of Non-Aqueous Electrolyte Secondary Batteries The carbonaceous material for a negative electrode of non-aqueous electrolyte secondary batteries of the present invention has an average particle diameter of 3 to 30 μm and can be obtained by the steps of: (1) heating plant-derived char having an average particle diameter of 100 to 10000 μm at 500° C. to 1250° C. under an inert gas atmosphere containing a halogen compound to demineralize in a gas-phase, (2) pulverizing a carbon precursor obtained by the demineralization in a gas-phase, and (3) heat treating the pulverized carbon precursor at 1000° C. to 1600° C. under a non-oxidizing gas atmosphere. That is, the carbonaceous material for a negative electrode of non-aqueous electrolyte secondary batteries of the present invention can be obtained by the above method for manufacturing a carbonaceous material for a negative electrode of non-aqueous electrolyte secondary batteries.

In the carbonaceous material for a negative electrode of non-aqueous electrolyte secondary batteries of the present invention, the demineralization step in a gas-phase (1), the pulverizing step (2), the heat treatment step (3), and the plant-derived char used as the carbon source, and the like, is described in the above item of the method for manufacturing a carbonaceous material for a negative electrode of non-aqueous electrolyte secondary batteries.

The physical properties such as an average particle diameter, a specific surface area, an amount of potassium, an amount of iron and the like of the carbonaceous material for a negative electrode of non-aqueous electrolyte secondary batteries of the present invention are not particularly limited. For example, however, the carbonaceous material having the specific surface area of 1 to 50 $m^2/g$, the amount of potassium of 0.1 weight % or less, and the amount of iron of 0.02 weight % or less is preferable.

(Non-Graphitizable Carbon Material)

The carbonaceous material for a negative electrode of non-aqueous electrolyte secondary batteries of the present invention is prepared from the plant-derived char as a carbon source, and thus, it is non-graphitizable carbon material. The non-graphitizable carbon causes little expansion and constriction at the time of the doping and dedoping of lithium to exhibit a high cycle durability.

The plant-derived char, which is the carbon source of the carbonaceous material for a negative electrode of non-aqueous electrolyte secondary batteries, is described in the above item of "plant-derived char" in the method for the manufacturing of the present invention.

(Average Particle Diameter)

An average particle diameter (volume average particle diameter:$Dv_{50}$) of carbonaceous material for non-aqueous electrolyte secondary batteries of the present invention is preferably 3 to 30 μm. If the average particle diameter is less than 3 μm, fine particles are increased and then the specific surface area of the carbonaceous material is increased. As a result, a reactivity of the carbonaceous material with an electrolytic solution is increased, and then an irreversible capacity, which can be used in charging but cannot be used in discharging, is increased. That is, a rate of unusable capacity of a positive electrode is increased, and thus, the average particle diameter of less than 3 μm is not preferable. Further, if a negative electrode is manufactured using the carbonaceous material, each space between carbonaceous materials becomes small, and thus a mobility of lithium ions in the electrolyte solution is suppressed. Therefore, this is not preferable. The lower limit of the average particle diameter is preferably 3 µm or more, further preferably 4 µm or more, most preferably 5 µm or more. On the other hand, when the average particle diameter is 30 µm or less, a diffusion-free path of lithium ions in the particle is short, and thus rapid charge and discharge are possible. Further, in order to improve the input/output performances, it is important to enlarge an electrode area. Thus, it is required to reduce the coating thickness of an active material to a current collector in an electrode preparation. In order to reduce the coating thickness, it is required to reduce the particle diameter of the active material. From this perspective, the upper limit of the average particle diameter is preferably 30 µm or less, more preferably 19 µm or less, further preferably 17 µm or less, further preferably 17 µm or less, further preferably 16 µm or less, most preferably 15 µm or less.

(Specific Surface Area)

The specific surface area of the carbonaceous material for non-aqueous electrolyte secondary batteries is 1 to 50 m$^2$/g, preferably 1.5 to 40 m$^2$/g, more preferably 2 to 40 m$^2$/g, further preferably 3 to 30 m$^2$/g. When a carbonaceous material having a specific surface area determined by a BET method of more than 50 m$^2$/g is used as a negative electrode for a non-aqueous electrolyte secondary battery, the decomposition of an electrolyte solution is increased, and is then a cause for increase in irreversible capacity. Thus, there is a possibility that the battery performance is lowered. When a carbonaceous material having a specific surface area determined by a BET method of less than 1 m$^2$/g is used as a negative electrode for a non-aqueous electrolyte secondary battery, the reaction area with an electrolyte solution is decreased, and thus, there is a possibility that input/output performances are lowered.

(Amount of Potassium)

The amount of potassium of the carbonaceous material for non-aqueous electrolyte secondary batteries is 0.1 weight % or less, more preferably 0.05 weight % or less, further preferably 0.03 weight % or less. In the non-aqueous electrolyte secondary batteries using a carbonaceous material for a negative electrode having an amount of potassium of more than 0.5 weight %, dedoping capacity may become lower and non-dedoping capacity may become higher.

(Amount of Iron)

The amount of iron of the carbonaceous material for non-aqueous electrolyte secondary batteries is 0.02 weight % or less, more preferably 0.015 weight % or less, more preferably 0.01 weight % or less, further preferably 0.005 weight % or less. In the non-aqueous electrolyte secondary batteries using a carbonaceous material for a negative electrode having a large amount of iron, there is a possibility that the battery generates heat by occurrences of micro short circuits. Further, there is a possibility that the above carbonaceous material has adverse effects on doping and dedoping performances.

<H/C Ratio>

The H/C ratio of the carbonaceous material for non-aqueous electrolyte secondary batteries of the present invention is not particularly limited. The H/C ratio was determined by measuring hydrogen atoms and carbon atoms by elemental analysis. Since the hydrogen content of the carbonaceous material decreases as the degree of carbonization increases, the H/C ratio tends to decrease. Accordingly, the H/C ratio is effective as an index expressing the degree of carbonization. The H/C ratio of the carbonaceous material of the present invention is not limited, but is 0.1 or less, preferably 0.08 or less. The H/C ratio is particularly preferably 0.05 or less. When the H/C ratio of hydrogen atoms to carbon atoms exceeds 0.1, the amount of functional groups present in the carbonaceous material increases, and the irreversible capacity increases due to a reaction with lithium. Therefore, it is not preferable.

[3] Negative Electrode for Non-Aqueous Electrolyte Secondary Batteries

The negative electrode for non-aqueous electrolyte secondary batteries of the present invention contains the carbonaceous material for a negative electrode of non-aqueous electrolyte secondary batteries of the present invention.

<<Preparation of Negative Electrode>>

The negative electrode using the carbonaceous material of the present invention can be prepared as follows. A binder is added to the carbonaceous material and then appropriate solvent is added thereto in an appropriate amount. The mixture is kneaded so as to be an electrode mixture. Subsequently, the electrode mixture is applied to an current collector such as a metal plate, dried, and press-formed, to obtain the negative electrode. An electrode having high conductivity can be produced by using the carbonaceous material of the present invention without particularly adding a conductivity agent, but a conductivity agent may be added as necessary when preparing the electrode mixture for the purpose of imparting even higher conductivity. Conductive carbon black, vapor growth carbon fiber (VGCF), carbon nanotubes, or the like can be used as a conductivity agent. The added amount of the conductivity agent differs depending on the type of conductivity agent that is used, but when the added amount is too small, the expected conductivity cannot be achieved, which is not preferable. Conversely, when the added amount is too large, the dispersion of the conductivity agent in the electrode mixture becomes poor, which is also not preferable. From this perspective, the proportion of the added amount of the conductivity agent is preferably from 0.5 to 10 weight % (here, it is assumed that the active material (carbonaceous material)+the amount of the binder+the amount of the conductivity aid=100 weight %), more preferably from 0.5 to 7 weight %, and particularly preferably from 0.5 to 5 weight %. The binders are not particularly limited as long as the binders (such as PVDF (polyvinylidene fluoride), polytetrafluoroethylene, and the mixture of SBR (styrene-butadiene rubber) and CMC (carboxymethylcellulose)) do not react with electrolyte solutions. Of these, PVDF is preferable in that the PVDF adhering to the active material surface minimally inhibits lithium ion movement and in that favorable input/output performances can be achieved. A polar solvent such as N-methyl pyrrolidone (NMP) is preferably used to dissolve PVDF and form a slurry, but an aqueous emulsion such as SBR or CMC may also be dissolved in water. When the added amount of the binder is too large, the electrical resistance of the resulting electrode becomes high, and the internal resistance of the battery also becomes high. This diminishes the battery performances, which is not preferable. When the added amount of the binder is too small, the bindings between the negative electrode active material particles, and the binding between the negative electrode active material particles and the current collector, become insufficient, which is not preferable. The preferable amount of the binder that is added differs depending on the type of binder that is used. In the case of a PVDF-type binder, the added amount is preferably 3 to 13 weight %, more preferably 3 to 10 weight %. On the other hand, in the case of a binder using water as a solvent, a plurality of binders such as a mixture of SBR and CMC are often used in combination, and the total amount of all of the binders that are used is preferably 0.5 to 5 weight % and more preferably 1 to 4 weight %. The electrode active material layer is typically formed on both sides of the current collector, but the layer may be formed on just one side as necessary. The amount of required current collectors or separators becomes smaller as the thickness of the electrode active material layer increases, which is preferable for increasing capacity. However, it is more advantageous from the perspective of improving the input/output characteristics for the electrode area of opposite electrodes to be wider, so when the active material layer is too thick, the input/output characteristics are diminished, which is not preferable. The thickness of the active material layer (on each side) is preferably from 10 to 80 μm, more preferably from 20 to 75 μm, and most preferably from 20 to 60 μm.

[4] Non-Aqueous Electrolyte Secondary Battery

The non-aqueous electrolyte secondary battery of the present invention contains the negative electrode for non-aqueous electrolyte secondary batteries of the present invention. The non-aqueous electrolyte secondary battery containing the negative electrode for non-aqueous electrolyte secondary batteries using the carbonaceous material of the present invention exhibits an excellent output performance and an excellent cycle performance.

<<Manufacture of Non-Aqueous Electrolyte Secondary Battery>>

When a negative electrode for a non-aqueous electrolyte secondary battery is formed using the negative electrode material of the present invention, the other materials constituting the battery such as the positive electrode material, separators, and the electrolyte solution are not particularly limited, and various materials that have been conventionally used or proposed for non-aqueous solvent secondary batteries can be used.

For example, layered oxide-based (as represented by $LiMO_2$, where M is a metal such as $LiCoO_2$, $LiNiO_2$, $LiMnO_2$, or $LiNi_xCo_yMo_zO_2$ (where x, y, and z represent composition ratios)), olivine-based (as represented by $LiMPO_4$, where M is a metal such as $LiFePO_4$), and spinel-based (as represented by $LiM_2O_4$, where M is a metal such as $LiMn_2O_4$) complex metal chalcogen compounds are preferable as positive electrode materials, and these chalcogen compounds may be mixed as necessary. A positive electrode is made by forming these positive electrode materials with an appropriate binder together with a carbon material for imparting conductivity to the electrode and forming a layer on an current collector.

A non-aqueous electrolyte solution used with this positive electrode and negative electrode combination is typically formed by dissolving an electrolyte in a non-aqueous solvent. For example, one, or a combination of two or more of organic solvents such as propylene carbonate, ethylene carbonate, dimethyl carbonate, diethyl carbonate, dimethoxyethane, diethoxyethane, γ-butyl lactone, tetrahydrofuran, 2-methyl tetrahydrofuran, sulfolane, or 1,3-dioxolane, may be used as a non-aqueous solvent. In addition, $LiClO_4$, $LiPF_6$, $LiBF_4$, $LiCF_3SO_3$, $LiAsF_6$, LiCl, LiBr, $LiB(C_6H_5)_4$, $LiN(SO_3CF_3)_2$, or the like is used as an electrolyte. A secondary battery is typically formed by making a positive electrode layer and a negative electrode layer formed, as described above, by facing one another via a liquid-permeable separator made of a nonwoven fabric or another porous material as necessary, and immersing the product in an electrolyte solution. A permeable separator made of a nonwoven fabric or another porous material ordinarily used in secondary batteries can be used as a separator. Alternatively, a solid electrolyte formed from a polymer gel impregnated with an electrolyte solution may be used instead of or together with a separator.

[5] Vehicle

For example, the non-aqueous electrolyte secondary batteries of the present invention are suitable for batteries (typically, non-aqueous electrolyte secondary batteries for vehicle-driving) mounted in vehicles such as an auto car. The vehicle of the present invention is not particularly limited, for example, there may be mentioned a vehicle which is generally known as an electric vehicle, a hybrid car between the electrical battery and fuel battery, internal-combustion engine, or the like. However, the vehicle has at least a power unit containing the above battery, an electrical drive system which is driven by electrical supply from the power unit, and a control unit for controlling the electrical drive system. Further, it may have a charge system wherein a damping energy is converted into electrical energy by a dynamic brake or regeneration brake, and then the non-aqueous electrolyte secondary battery is charged with the converted electrical energy.

EXAMPLES

The present invention will now be further illustrated by, but is by no means limited to, the following Examples.

In addition, the measurement methods for the physical properties of the carbonaceous material for non-aqueous electrolyte secondary batteries of the present invention (the "average particle diameter as determined by laser diffraction", the "atom ratio of hydrogen/carbon (H/C)", the "specific surface area", and the "Mineral content") will be described hereinafter, but the physical properties described in this specification are based on values determined by the following methods.

(Evaluation Test Items)
<<Particle Size Distribution>>

Three drops of a dispersant (cationic surfactant "SN-WET 366" (made by the San Nopco Co.)) were added to approximately 0.1 g of a sample, and the dispersant was blended into the sample. Next, 30 mL of purified water was added, and after the sample was dispersed for approximately 2 minutes with an ultrasonic washer, the particle size distribution within the particle size range of 0.5 to 3000 μm was determined with a particle size distribution measurement device ("SALD-3000S" made by the Shimadzu Corporation). A refractive index of the particles is defined as 2.0 to 0.1 i.

The average particle size $Dv_{50}$ (μm) was determined from the resulting particle size distribution as the particle size yielding a cumulative volume of 50%.

<<Atom Ratio of Hydrogen/Carbon (H/C)>>

The atom ratio was measured in accordance with the method prescribed in JIS M8819. That is, the ratio of the numbers of hydrogen/carbon atoms was determined by obtaining the weight ratio of hydrogen and carbon in a sample obtained by elemental analysis using a CHN analyzer (2400II made by Perkin Elmer Inc.), and dividing the weight ratio by the atomic mass number of each element.

<<Specific Surface Area>>

The specific surface area was measured in accordance with the method prescribed in JIS Z8830. A summary is given below.

A value $v_m$ was determined by a one-point method (relative pressure x=0.2) based on nitrogen adsorption at the temperature of liquid nitrogen using the approximation $v_m=1/(v(1-x))$ derived from the BET equation, and the specific area of the sample was calculated from the following formula:

Specific area=$4.35 \times v_m$ (m$^2$/g)

(wherein, $v_m$ is the amount of adsorption (cm$^3$/g) required to form a monomolecular layer on the sample surface; v is the amount of adsorption (cm$^3$/g) actually measured, and x is the relative pressure).

Specifically, the amount of adsorption of nitrogen in the carbonaceous substance at the temperature of liquid nitrogen was measured as follows using a "Flow Sorb II2300" made by MICROMERITICS.

A test tube was filled with carbon material, and the test tube was cooled to −196° C. while infusing helium gas containing nitrogen gas at a concentration of 20 mol % so that the nitrogen was adsorbed in the carbon material. Next, the test tube was returned to room temperature. The amount of nitrogen desorbed from the sample at this time was measured with a thermal conductivity detector and used as the adsorption gas amount v.

<<Mineral Content>>

In order to measure potassium content and iron content, a carbon sample containing predetermined amounts of potassium and iron was prepared, and then standard curves showing relationships between an intensity of potassiumKα ray and potassium content, and an intensity of ironKα ray and iron content were prepared by measuring the carbon sample using an X-ray fluorescence spectrometer. Next, potassiumKα ray and ironKα ray intensities of a sample to be tested were measured, and the potassium content and iron content of the sample were calculated from the prepared standard curves. Fluorescent X-ray analysis was carried out using LAB CENTER XRF-1700 [Shimadzu Corporation] in accordance with the following conditions. A holder for an upper-irradiated system was used, and a measured area of a sample was defined as an inside of circle of said holder with a diameter of 20 mm. The sample to be tested was placed by putting 0.5 g of a sample to be tested into a polyethylene container having an inner diameter of 25 mm and sealing an underside of the polyethylene container by plankton net. A measurement surface thereof was covered with a polypropylene film, and then the sample was measured. The conditions of the X-ray source were defined as 40 kV and 60 mA. Potassium content was measured by using LiF(200) as a dispersive crystal and gas-flow type proportional counter as a detector, and the sample was scanned in the ranges of 90 to 140° (2θ) at 8°/min of scan speed. Iron content was measured by using LiF(200) as a dispersive crystal and scintillation counter as a detector, and the sample was scanned in the ranges of 90 to 140° (2θ) at 8°/min of scan speed.

Example 1

Nitrogen gas containing 1 volume % of hydrogen chloride gas was supplied at a flow rate of 10 L/minute to 100 g of the palm shell char A with a diameter of 2.360 to 0.850 mm (containing 98 weight % of particles with diameter of 2.360 to 0.850 mm) which was obtained by crushing palm shells and carbonizing the crushed palm shells at 500° C. After the above treatment for 80 minutes at 950° C., only the hydrogen chloride gas supply was cut off, and further the resulting palm shell char A was treated for 30 minutes at 950° C. to obtain the heat treated-palm shell carbon B. The resulting heat treated-palm shell carbon was preliminarily pulverized by ball mill to become pre-pulverized carbon with an average particle diameter of 8 μm, and the resulting carbon was pulverized and classified by a compact jet mill (Co-Jet System α-mkIII). The resulting powdery carbon precursor was placed in a horizontal, tubular furnace and subjected to final heat treatment at 1200° C. for 1 hour under a nitrogen atmosphere to obtain the carbonaceous material 1 for a negative electrode of non-aqueous electrolyte secondary batteries with an average particle diameter of 7 μm. The conditions of demineralization and heat treatment and the physical properties of the resulting carbonaceous material are shown in Table 1.

Example 2

The procedure described in Example 1 was repeated, except that the average particle diameter was 11 μm, to obtain the carbonaceous material 2.

Example 3

The procedure described in Example 1 was repeated, except that the average particle diameter was 15 μm, to obtain the carbonaceous material 3.

Example 4

The procedure described in Example 2 was repeated, except that the temperature of treatment with hydrogen chloride gas was 850° C., to obtain the carbonaceous material 4.

Example 5

The procedure described in Example 2 was repeated, except that the average particle diameter was 13 μm and the temperature of treatment with hydrogen chloride gas was 1200° C., to obtain the carbonaceous material 5.

Example 6

The procedure described in Example 2 was repeated, except that the temperature of the final heat treatment was 1100° C., to obtain carbonaceous material 6.

Example 7

The procedure described in Example 2 was repeated, except that the temperature of the final heat treatment was 1150° C., to obtain the carbonaceous material 7

Example 8

The procedure described in Example 2 was repeated, except that the temperature of the final heat treatment was 1250° C., to obtain the carbonaceous material 8.

Example 9

The procedure described in Example 1 was repeated, except that the amount of particles having a particle diameter of 1 μm or less was 2.5% by changing a classification point in the pulverization, to obtain the carbonaceous material 9.

Example 10

A palm char was used as a carbon source, and nitrogen gas containing 1 volume % of hydrogen chloride gas was supplied at a flow rate of 10 L/minute thereto. After the above treatment for 110 minutes at 950° C., only the hydrogen chloride gas supply was cut off, and then the resulting palm char was heat-treated for 30 minutes at 950° C. to obtain the palm heat treated carbon. Subsequently, the procedure described in Example 2 was repeated to obtain the carbonaceous material 10.

Example 11

The procedure described in Example 1 was repeated, except that the amount of particles having a particle diameter of 1 μm or less was 4.2% by changing a classification point in the pulverization, to obtain the carbonaceous material 11.

Comparative Example 1

The procedure described in Example 2 was repeated, except that the temperature of treatment with hydrogen chloride gas was 400° C., to obtain the comparative carbonaceous material 1.

Comparative Example 2

The procedure described in Example 2 was repeated, except that the average particle diameter was 12 μm and the temperature of treatment with hydrogen chloride gas was 1300° C., to obtain the comparative carbonaceous material 2.

Comparative Example 3

The procedure described in Example 2 was repeated, except that the average particle diameter was 2 μm, to obtain the comparative carbonaceous material 3.

Comparative Example 4

The procedure described in Example 2 was repeated, except that the average particle diameter was 10 μm and the temperature of the final heat treatment was 950° C., to obtain the comparative carbonaceous material 4.

Comparative Example 5

The palm shell chars were subjected to pre-heat treatment at 600° C. in a nitrogen gas atmosphere (normal pressure), and pulverized to prepare a powdery carbon precursor having an average particle diameter of 19 μm. Next, the powdery carbon precursor was immersed in a 35% hydrogen chloride solution for 1 hour, and then a demineralizing treatment was carried out by twice repeating the washing with boiling water for 1 hour, to thereby obtain the demineralized powdery carbon precursor. 10 g of the resulting, demineralized powdery carbon precursor was placed in a horizontal tubular furnace and subjected to final heat treatment at 1200° C. for 1 hour under a nitrogen atmosphere to prepare the comparative carbonaceous material 5. As shown in Table 1, the amount of potassium is 0.049 weight % or less, and the amount of iron is 0.059 weight % or less. That is, the removal efficiencies of potassium and iron is lower, compared to the carbonaceous materials obtained by the demineralization in the gas-phase.

68 kg of petroleum pitch having a softening temperature of 210° C., a quinoline-insoluble content of 1 weight % and an H/C atomic ratio of 0.63, and 32 kg of naphthalene, were placed in a 300 liter-pressure-resistant vessel equipped with stirring blades, melt-mixed while heating at 190° C. and, after being cooled to 80 to 90° C., extruded to form a string-shaped product having a diameter of approximately 500 μm. Then, the string-shaped product was pulverized so as to provide a diameter-to-length ratio of approximately 1.5, and the pulverized product was charged into an aqueous solution containing 0.53 weight % of polyvinyl alcohol (saponification degree=88%) and heated to 93° C., followed by stirring for dispersion and cooling to form spherical pitch products. After removing a major part of water by filtration, the spherical pitch products were subjected to extraction with approximately 6 times by weight of n-hexane to remove the naphthalene in the spherical pitch products.

The resulting porous, spherical pitch product was heated to 260° C. while passing heated air and held at 260° C. for 1 hour to be oxidized into a thermally-infusible, porous pitch product. The resulting thermally-infusible, porous pitch product was subjected to pre-heat treatment at 600° C. for 1 hour in nitrogen gas atmosphere, and then pulverized using a jet mill, and classified to prepare fine particles of a carbon precursor. Subsequently, the carbon precursor was subjected to final heat treatment at 1200° C. for 1 hour to prepare the comparative carbonaceous material 6.

(Doping/Dedoping Capacity for Active Material)

Electrodes and non-aqueous electrolyte secondary batteries were prepared by using the carbon materials obtained in the above Examples and Comparative Examples, and the electrode performances thereof were evaluated, through the following steps (a) to (e).

(a) Preparation of an Electrode 90 parts by weight of the carbon material as described above and 10 parts by weight of polyvinylidene fluoride ("KF#1100" made by KUREHA CORPORATION) were formed together with NMP into a paste composition, and then the composition was evenly applied onto a copper foil. After being dried, the coating electrode was punched into a disc with a diameter of 15 mm from the copper foil, and it was pressed to prepare the positive electrode. The amount of carbon material in an electrode was adjusted to approximately 10 mg.

(b) Preparation of a Test Battery

The carbonaceous material of the present invention is suited to constitute a negative electrode of a non-aqueous electrolyte secondary battery. However, in order to precisely evaluate the discharge capacity (de-doping capacity) and irreversible capacity (non-dedoping capacity) of a battery active material without being affected by a fluctuation in the performances of a counter electrode, a lithium secondary battery was formed using the electrode obtained above together with a counter electrode comprising lithium metal with stable characteristics, and the characteristics thereof were evaluated.

The lithium electrode was prepared in a glove box of an Ar atmosphere. An electrode (counter electrode) was formed by spot-welding a stainless steel mesh disc with a diameter of 16 mm on the outer lid of a 2016-size coin-type battery can in advance, stamping a thin sheet of metal lithium with a thickness of 0.8 mm into a disc shape with a diameter of 15 mm, and pressing the thin sheet of metal lithium into the stainless steel mesh disc.

Using a pair of electrodes produced in this way, LiPF$_6$ was added at a proportion of 1.5 mol/L to a mixed solvent prepared by mixing ethylene carbonate, dimethyl carbonate, and methyl ethyl carbonate at a volume ratio of 1:2:2 as an electrolyte solution. A polyethylene gasket was used as a fine, porous membrane separator made of borosilicate glass fibers with a diameter of 19 mm to assemble a 2016-size coin-type, non-aqueous electrolyte lithium secondary battery in an Ar glove box.

(c) Measurement of Battery Capacity

Charge-discharge tests were performed on a lithium secondary battery with the configuration described above using a charge-discharge tester ("TOSCAT" made by Toyo System Co., Ltd.). A lithium doping reaction for inserting lithium into the carbon electrode was performed with a constant-current/constant-voltage method, and a de-doping reaction was performed with a constant-current method. Here, in a battery using a lithium chalcogen compound for the positive electrode, the doping reaction for inserting lithium into the carbon electrode is called "charging", and in a battery using lithium metal for a counter electrode, as in the test battery of the present invention, the doping reaction for the carbon electrode is called "discharging". The manner in which the doping reactions for inserting lithium into the same carbon electrode thus differs depending on the pair of electrodes used. Therefore, the doping reaction for inserting lithium into the carbon electrode will be described as "charging" hereinafter for the sake of convenience. Conversely, "discharging" refers to a charging reaction in the test battery but is described as "discharging" for the sake of convenience since it is a de-doping reaction for removing lithium from the carbon material. The charging method used here is a constant-current/constant-voltage method. Specifically, constant-current charging was performed at 0.5 mA/cm$^2$ until the terminal voltage reached 0 V. After the terminal voltage reached 0 mV, constant-voltage charging was performed at a terminal voltage of 0 mV, and charging was continued until the current value reached 20 µA. At this time, a value determined by dividing the electricity supply by the weight of the carbon material of the electrode is defined as the charge capacity per unit weight of the carbon material (mAh/g). After charging completed, the battery circuit was opened for 30 minutes, and discharging was performed thereafter. Discharging was performed at a constant current of 0.5 mA/cm$^2$ until the final voltage reached 1.5 V. At this time, a value determined by dividing the electrical discharge by the weight of the carbon material of the electrode is defined as the discharge capacity per unit weight of the carbon material (mAh/g). The irreversible capacity was calculated as the discharge capacity subtracted from the charge capacity.

The charge-discharge capacity and irreversible capacity were determined by averaging n=3 measurements for test batteries produced using the same sample.

After charging-discharging were performed in accordance with (c) for a lithium secondary battery with the configuration described above, charging-discharging was performed once again with the same method.

Next, after constant-current charging was performed at 0.5 mA/cm$^2$ until the terminal voltage reached 0 V, constant-voltage charging was performed at a terminal voltage of 0 mV, and charging was performed until the current value declined to 20 µA. After charging was complete, the battery circuit was opened for 30 minutes, and constant-current discharging was then performed at 25 mA/cm$^2$ until the terminal voltage reached 1.5 V. A value determined by dividing the electrical discharge at this time by the weight of the carbon material of the electrode is defined as the rapid discharge capacity (mAh/g). In addition, a value determined by dividing the discharge capacity at 25 mA/cm$^2$ by the second discharge capacity at 0.5 mA/cm$^2$ is defined as the output characteristics (%).

Next, n=3 measurements for test batteries produced using the same sample were averaged.

(e) Cycle Test

First, NMP was added to 94 parts by weight of each of the carbon materials obtained in Working Examples and Comparative Examples and 6 parts by weight of polyvinylidene fluoride (KF#9100 made by the Kureha Corporation). This was formed into a pasty consistency and applied uniformly to copper foil. After the sample was dried, the coated electrode was punched into a circle shape with a diameter of 15 mm, and this was pressed so as to form a negative electrode. The amount of the carbon material in the electrode was adjusted to approximately 10 mg.

Next, NMP was added to 94 parts by weight of lithium cobaltate (LiCoO$_2$), 3 parts by weight of carbon black, and 3 parts by weight of polyvinylidene fluoride (KF#1300 made by the Kureha Corporation). This was formed into a pasty consistency and then applied uniformly to aluminum foil. After the sample was dried, the coated electrode was punched into a circular shape with a diameter of 14 mm. Here, the amount of lithium cobaltate in the positive electrode was adjusted so as to achieve 95% of the charge capacity of the negative electrode active material measured in (c). The volume of lithium cobaltate was calculated as 150 mAh/g.

Using a pair of electrodes prepared in this way, LiPF$_6$ was added at a proportion of 1.5 mol/L to a mixed solvent prepared by mixing ethylene carbonate, dimethyl carbonate, and methyl ethyl carbonate at a volume ratio of 1:2:2 as an electrolyte solution. A polyethylene gasket was used as a fine, porous membrane separator made of borosilicate glass fibers with a diameter of 19 mm to assemble a 2016-size coin-type, non-aqueous electrolyte lithium secondary battery in an Ar glove box.

Here, cycle tests began after the sample was aged by repeating three cycles of charging and discharging. Under the constant-current/constant-voltage conditions used in the cycle tests, charging was performed at a constant-current density of 2.5 mA/cm$^2$ until the battery voltage reached 4.2 V, and charging was then performed until the current value reached 50 µA while constantly changing the current value so as to maintain the voltage at 4.2 V (while maintaining a constant voltage). After the completion of charging, the battery circuit was opened for 30 minutes, and discharging was performed thereafter. Discharging was performed at a constant-current density of 2.5 mA/cm$^2$ until the battery voltage reached 2.75 V. The charging and discharging were repeated for 350 cycles at 50° C., and the discharge capacity of the 350th cycle was divided by the discharge capacity of the 1st cycle and defined as the cycle characteristics (%).

The characteristics of the resulting lithium secondary battery are shown in Table 2. The changes of the discharge capacity from 1 to 350 cycles in Example 2 and Comparative Example 6 are shown in FIG. 1. The lithium ion secondary battery using the carbonaceous material prepared from plant-derived char exhibits an excellent cycle performance at high temperature, compared to the lithium ion secondary battery using the carbonaceous material prepared from pitch.

TABLE 1

| | Material | Demineralization Gas | Demineralization Temperature | Final heat-treatment temp ° C. | Particle diameter Dv$_{50}$ μm | Particle diameter 1 μm or less % | H/C | K content % | Fe content % | Specific surface area m$^2$/g |
|---|---|---|---|---|---|---|---|---|---|---|
| Example 1 | Palm shell | Gas-phase HCl gas | 950 | 1200 | 7 | 0.0 | 0.02 | 0.004 | 0.002 | 22 |
| Example 2 | Palm shell | Gas-phase HCl gas | 950 | 1200 | 11 | 0.0 | 0.02 | 0.003 | 0.002 | 15 |
| Example 3 | Palm shell | Gas-phase HCl gas | 950 | 1200 | 15 | 0.9 | 0.02 | 0.003 | 0.004 | 18 |
| Example 4 | Palm shell | Gas-phase HCl gas | 850 | 1200 | 11 | 0.3 | 0.02 | 0.031 | 0.002 | 14 |
| Example 5 | Palm shell | Gas-phase HCl gas | 1200 | 1200 | 13 | 0.4 | 0.02 | N.D. | 0.001 | 16 |
| Example 6 | Palm shell | Gas-phase HCl gas | 950 | 1100 | 11 | 0.1 | 0.05 | 0.003 | 0.005 | 21 |
| Example 7 | Palm shell | Gas-phase HCl gas | 950 | 1150 | 11 | 0.0 | 0.04 | 0.003 | 0.003 | 18 |
| Example 8 | Palm shell | Gas-phase HCl gas | 950 | 1250 | 11 | 0.0 | 0.02 | 0.003 | 0.001 | 14 |
| Example 9 | Palm shell | Gas-phase HCl gas | 950 | 1200 | 7 | 2.5 | 0.02 | 0.004 | 0.005 | 25 |
| Example 10 | Palm | Gas-phase HCl gas | 950 | 1200 | 11 | 0.0 | 0.02 | N.D. | 0.010 | 15 |
| Example 11 | Palm shell | Gas-phase HCl gas | 950 | 1200 | 7 | 4.2 | 0.02 | 0.005 | 0.007 | 30 |
| Comparative Example 1 | Palm shell | Gas-phase HCl gas | 400 | 1200 | — | — | — | 0.833 | 0.002 | — |
| Comparative Example 2 | Palm shell | Gas-phase HCl gas | 1300 | 1200 | 12 | 2.4 | 0.02 | N.D. | N.D. | 19 |
| Comparative Example 3 | Palm shell | Gas-phase HCl gas | 950 | 1200 | 2 | 29 | 0.03 | 0.009 | 0.036 | 39 |
| Comparative Example 4 | Palm shell | Gas-phase HCl gas | 950 | 950 | 10 | 0.7 | 0.06 | 0.003 | 0.003 | 23 |
| Comparative Example 5 | Palm shell | Liquid-phase HCl solution | 100 | 1200 | 19 | 0.0 | 0.02 | 0.049 | 0.059 | 5.4 |
| Comparative Example 6 | Petroleum pitch | — | — | 1200 | 11 | 0.1 | 0.02 | N.D. | N.D. | 6.9 |

The carbonaceous materials of the present invention of Examples 1 to 11 were excellent in terms of the amount of Fe, compared to the carbonaceous materials of Comparative example 5 obtained by the demineralization in liquid-phase.

TABLE 2

| | Battery performance | | | |
|---|---|---|---|---|
| | Discharge capacity mAh/g | Irreversible capacity mAh/g | Output performance % | Cycle performance at high temp. % |
| Example 1 | 419 | 98 | 65 | — |
| Example 2 | 465 | 105 | 65 | 75.9 |
| Example 3 | 440 | 103 | 56 | — |
| Example 4 | 477 | 103 | 62 | — |
| Example 5 | 417 | 96 | 55 | — |
| Example 6 | 495 | 149 | 54 | — |
| Example 7 | 482 | 124 | 60 | — |
| Example 8 | 440 | 90 | 73 | — |
| Example 9 | 418 | 104 | 60 | — |
| Example 10 | 406 | 106 | 52 | — |
| Example 11 | 417 | 116 | — | — |
| Comparative Example 1 | — | — | — | — |
| Comparative Example 2 | 355 | 77 | — | — |
| Comparative Example 3 | — | — | — | — |
| Comparative Example 4 | 653 | 293 | — | — |
| Comparative Example 5 | — | — | — | — |
| Comparative Example 6 | 473 | 78 | 46 | 62.3 |

In Examples 1, 9, and 11, the irreversible capacity increased with the increase of the particles having a diameter of less than 1 μm, i.e. 0 volume %, 2.5 volume %, and 4.2 volume %, respectively. That is to say, the irreversible capacity decreased by removing the particles having a diameter of less than 1 μm.

INDUSTRIAL APPLICABILITY

In the method for manufacturing a carbonaceous material for a negative electrode of non-aqueous electrolyte secondary batteries, potassium can be efficiently removed and thus the plant-derived carbonaceous material having a diameter of less than 20 μm for a negative electrode can be industrially-manufactured in large quantity thereby. The non-aqueous electrolyte secondary battery using the carbonaceous material of the present invention exhibits an excellent output performance (rate performance) and cycle performance, and thus can be used as batteries for hybrid electric vehicles (HEV) and electrical vehicles (EV), in which long service life and high input/output performances are required.

The invention claimed is:

1. A method for manufacturing a carbonaceous material having an average particle diameter of 3 to 30 μm, for a negative electrode of non-aqueous electrolyte secondary batteries comprising the steps of:
   (1) heating plant-derived char having an average particle diameter of 100 to 10000 μm at 850° C. to 1250° C. under an inert gas atmosphere containing a chlorine compound to demineralize the plant-derived char in a gas-phase,
   (2) pulverizing a carbon precursor obtained by the demineralization of the plant-derived char in a gas-phase, and
   (3) heat treating the pulverized carbon precursor at 1000° C. to 1600° C. under a non-oxidizing gas atmosphere.

2. The method for manufacturing a carbonaceous material for a negative electrode of non-aqueous electrolyte secondary batteries according to claim 1, further comprises a step of removing particles having a particle diameter of 1 μm or less so that an amount of the particle diameter of 1 μm or less became 3 volume % or less in the pulverized carbon precursor, during or after the pulverizing step (2).

3. A carbonaceous material for a negative electrode of non-aqueous electrolyte secondary batteries, obtained by the method of claim 1, wherein an average particle diameter is 3 to 30 μm,
an amount of element potassium is 0.1 weight % or less, and
an amount of element iron is 0.02 weight % or less.

4. The carbonaceous material according to claim 3, comprising particles having a particle diameter of 1 μm or less account for 3.0 volume % or less.

5. The carbonaceous material according to claim 3, comprising a specific surface area is 1 to 50 $m^2/g$.

6. A negative electrode of a non-aqueous electrolyte secondary battery comprising the carbonaceous material according to claim 3.

7. The negative electrode of a non-aqueous electrolyte secondary battery according to claim 6, wherein an active material layer exists on one surface or both surfaces of a metal current collector, and a thickness of the active material layer on one surface is 80 μm or less.

8. A non-aqueous electrolyte secondary battery comprising the negative electrode according to claim 6.

9. A non-aqueous electrolyte secondary battery comprising the carbonaceous material according to claim 3.

10. A vehicle having the non-aqueous electrolyte secondary battery according to claim 9.

* * * * *